US011132648B2

(12) United States Patent
Byron et al.

(10) Patent No.: US 11,132,648 B2
(45) Date of Patent: Sep. 28, 2021

(54) COGNITIVE-BASED ENHANCED MEETING RECOMMENDATION

(71) Applicant: INTERNATIONAL BUSINESS MACHINES CORPORATION, Armonk, NY (US)

(72) Inventors: Donna K. Byron, Petersham, MA (US); Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/917,948

(22) Filed: Mar. 12, 2018

(65) Prior Publication Data

US 2019/0279164 A1 Sep. 12, 2019

(51) Int. Cl.
*G06Q 10/10* (2012.01)
*G06N 5/02* (2006.01)
(Continued)

(52) U.S. Cl.
CPC ..... *G06Q 10/1095* (2013.01); *G06F 16/2457* (2019.01); *G06F 16/9535* (2019.01); *G06N 5/02* (2013.01)

(58) Field of Classification Search
CPC ............ G06Q 10/1095; G06F 16/9535; G06F 16/2457; G06N 5/02
See application file for complete search history.

(56) References Cited

U.S. PATENT DOCUMENTS 8,219,501 B2 7/2012 Teicher
8,627,214 B2 1/2014 Beerse et al.
(Continued)

FOREIGN PATENT DOCUMENTS

WO 2011095897 A2 8/2011
WO 2017003491 A1 1/2017
WO 2017025485 A1 2/2017

OTHER PUBLICATIONS

Anson et al., "Beyond Face-To-Face: A Field Study of Electronic Meetings in Different Time and Place Modes," Journal of Organizational Computing and Electronic Commerce, 2004, p. 127-152, vol. 14, No. 2.
(Continued)

*Primary Examiner* — Patricia H Munson
*Assistant Examiner* — Marjorie Pujols-Cruz
(74) *Attorney, Agent, or Firm* — Ewa M. Wozniak (57) ABSTRACT

A method, computer system, and a computer program product for a cognitive-based meeting format recommendation is provided. The present invention may include receiving an input. The present invention may also include determining a preferred mode of user communication based on analyzing the received input. The present invention may then include analyzing an upcoming meeting based on the determined preferred mode of user communication. The present invention may further include analyzing a plurality of technical equipment available based on the analyzed upcoming meeting. The present invention may also include providing a recommendation to a user based on the group of analyses consisting of the preferred mode of user communication, the upcoming meeting and the plurality of technical equipment available. The present invention may then include analyzing the provided recommendation. The present invention may further include adjusting a recommendation model based on the analyzed recommendation.

18 Claims, 5 Drawing Sheets

(51) Int. Cl.
*G06F 16/2457* (2019.01)
*G06F 16/9535* (2019.01)

(56) References Cited

U.S. PATENT DOCUMENTS

| | | | |
|---|---|---|---|
| 9,317,834 B2 | 4/2016 | Horvitz et al. | |
| 9,342,625 B2 | 5/2016 | Doganata et al. | |
| 9,558,457 B2 | 1/2017 | V et al. | |
| 9,615,060 B1* | 4/2017 | Hodge | G06Q 50/26 |
| 2009/0106077 A1 | 4/2009 | Bhogal et al. | |
| 2010/0082801 A1* | 4/2010 | Patel | G06Q 10/00 709/224 |
| 2011/0154208 A1 | 6/2011 | Horii | |
| 2013/0144682 A1 | 6/2013 | Dhara et al. | |
| 2013/0246116 A1 | 9/2013 | Bank et al. | |
| 2014/0171129 A1 | 6/2014 | Benzatti et al. | |
| 2014/0258503 A1* | 9/2014 | Tong | H04L 12/1827 709/224 |
| 2016/0042226 A1* | 2/2016 | Cunico | G06K 9/00315 382/103 |
| 2016/0105773 A1 | 4/2016 | Wawrowski et al. | |
| 2016/0283912 A1 | 9/2016 | Kilicli et al. | |
| 2016/0342950 A1* | 11/2016 | Pignataro | G06Q 10/1095 |
| 2017/0286851 A1* | 10/2017 | Myslinski | G06F 16/3344 |
| 2018/0046957 A1* | 2/2018 | Yaari | G06Q 10/1095 |
| 2019/0132265 A1* | 5/2019 | Nowak-Przygodzki | G06Q 10/1093 |

OTHER PUBLICATIONS

Mell et al., "The NIST Definition of Cloud Computing," National Institute of Standards and Technology, Sep. 2011, p. 1-3, Special Publication 800-145.

Padalinskaya, "Face-to-face Meeting or Video Conference? Factors Influencing Organisational Choice of Communication Media," University of Stavanger Master Thesis, 2014, p. 1-51.

Romano et al., "Meeting Analysis: Findings from Research and Practice," Proceedings of the 34th Hawaii International Conference on System Sciences, 2001, 13 Pages, IEEE.

* cited by examiner

COGNITIVE-BASED ENHANCED MEETING RECOMMENDATION

BACKGROUND

The present invention relates generally to the field of computing, and more particularly to cognitive computing. Individuals have preferences about conducting meetings. Some meetings may be more effective if conducted face-to-face as opposed to a web based online meeting or a conference call. Individuals may also be more comfortable with a particular meeting format based on the type of meeting, the other individuals attending the meeting and the topic of the meeting.

SUMMARY

Embodiments of the present invention disclose a method, computer system, and a computer program product for a cognitive-based meeting format recommendation. The present invention may include receiving an input. The present invention may also include determining a preferred mode of user communication based on analyzing the received input. The present invention may then include analyzing an upcoming meeting based on the determined preferred mode of user communication. The present invention may further include analyzing a plurality of technical equipment available based on the analyzed upcoming meeting. The present invention may also include providing a recommendation to a user based on the group of analyses consisting of the preferred mode of user communication, the upcoming meeting and the plurality of technical equipment available. The present invention may then include analyzing the provided recommendation. The present invention may further include adjusting a recommendation model based on the analyzed recommendation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for cognitive meeting scheduling. As such, the present embodiment has the capacity to improve the technical field of cognitive meeting scheduling by providing optimal meeting type suggestions for a user, an individual or a group of people. More specifically, a cognitive meeting scheduling program will significantly improve people's effectiveness and productivity by suggesting the optimal meeting format using the correct tools (i.e., technology available) and an optimal meeting length.

As previously described, individuals have preferences about conducting meetings (e.g., forums, discussions, debates, meetups, business meetings, personal meetings or events). Some meetings may be more effective if conducted face-to-face as opposed to a web based online meeting or a conference call. Individuals may also be more comfortable with a particular meeting format based on the type of meeting, the other individuals attending the meeting and the topic or content of the meeting. For example, for an individual who is not technologically savvy and has a complicated topic to discuss with diagrams to present, an in-person meeting may be a better option to communicate the complicated content for an effective presentation.

An individual (i.e., a user or a person) may conduct meetings online (e.g., web based, web conference, web-based audio and video or web-based audio only) using various technologies, however, online meetings and face-to-face meetings may only provide some available options to conduct a meeting. Online meetings may be preferable to an individual who gets stressed or feels uneasy when attending a face-to-face (i.e., in-person) meeting. Face-to-face meetings may be preferable to attend when an individual is socially comfortable with in-person interaction and may receive more understanding of the context of the meeting.

An individual's meeting preferences may be known only to the individual and stating which type of meeting is preferred may not be a conversation had by many people at the time of scheduling. Therefore, it may be advantageous to, among other things, provide an intelligent cognitive meeting analysis that can analyze an individual's past experiences, other individuals feedback and the previous outcomes of meetings to suggest future meeting types. The cognitive meeting analysis may generate and provide optimal outcomes by suggesting the type of meeting (e.g., face-to-face, web-based or telephone conference) preferable to the user and similar individuals or groups of people.

According to at least one embodiment, a cognitive meeting scheduling program may capitalize on a user's past experiences. One past experience for analysis may include different types of a user's daily activities, such as work activities, hobby activities, and personal life activities. One other past experience may include the typical length of time for each meeting the user attends, for example, a recurring work meeting that lasts 30 minutes once per week. Another past experience analysis may include whether a user is able to focus during a conversation. A user's focus may be measured by biometric analysis (e.g., heartbeat, blood flow, pupil dilation), by a camera (e.g., eye focus area, head turned towards the person speaking or head looking down) or by microphone (e.g., voice analysis, interactive level or number of responses made by user).

A cognitive meeting scheduling program may analyze the accuracy of the content, such as the input content or the historical research value content. Input content may be provided by the user in real-time and historical research value content may be analyzed through historical data such as social media, previous meeting analysis and measuring a user's productivity levels and engagement levels from outcomes of a meeting. Evaluating the accuracy of the content provided by a user may compare the gathered information (i.e., data) with existing credible data stored in a central repository. Credible data may be existing knowledge base or data from, for example, the Library of Congress. Evaluating the accuracy of the content may also be implemented by analyzing the participants feedback, for example, by monitoring chat messages posted on a meeting chat board and detecting that many messages express doubtful opinions. The observed data may be used to provide feedback to the user regarding the user's ability to deliver accurate content during the meeting or to recommend to the user a more accurate delivery of information.

Evaluating the completeness of the content may include analysis of the data provided by the user during a meeting. The completeness of data may be measured by factors such as whether the meeting participants keep asking for content from the discussion or presentation either during or after the meeting or via a group chat, email or telephone call.

Evaluating the outcome of a meeting may include an analysis about whether the outcome of the meeting, for example, is positive, negative, indifferent or engaged by the user or the participants. Meeting outcome factors may include feedback via social media, social media or network discussions, surveys, online messages, online chats, telephone calls, emails or text messages. Meeting outcome factors may also include analysis of explicit feedback regarding the user's experience. The user experience feedback may use natural language processing (NLP) analyzed by multi-label natural language classifiers, such as detecting if a user was uncomfortable or felt time pressured.

User and participant analysis of meeting accuracy, completeness, effectiveness and outcomes may be provided using NLP, semantic analysis, sentiment (i.e., emotive) analysis and biometric analysis. The various analyses are capable of processing large amounts of data in order to provide optimal recommendations to a user. The large amount of data may be obtained from many different data repositories (i.e., databases or corpora) in a very small amount of time. User and participant input and output sources may include devices, such as, cameras, sensors, microphones, personal computers, smart telephones, smart tablets, office conference equipment (i.e., telephones and projectors) and communication networks.

NLP may be used to analyze the effect a particular meeting length and format has on a user. A cognitive meeting program may receive both structured and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The received data and the feedback data may be processed through NLP to extract information that is meaningful to a user operating the cognitive meeting program. An NLP system may be created and trained by rules or machine learning. An example of how the cognitive meeting program may use the NLP process may include determining that a text regarding a specific meeting provided effective and positive feedback to the user from a participant. The cognitive meeting program may build into a historical database the meeting format, time, location, participants, context, subject and effectiveness for future data analysis upon recommendation to a user.

Semantic analysis may be used to infer the complexity of interactions, such as the meaning and intent of the language, both verbal and non-verbal (e.g., spoken words captured by a microphone or type written words captured on an email or a chat session between co-workers during or after a meeting). Semantic analysis may consider a user's current meeting preferences and historical meeting preferences to provide analysis regarding what type of meetings should be scheduled in the future, for example, a user may prefer telephone conferences for some topics and may prefer face-to-face meetings for other topics based on comfort level with the topic and based on the length of the meetings. Semantic analysis may also consider syntactic structures at various levels to infer meaning to a user's phrases, sentences and paragraphs. Static data may also be considered through semantic analysis, for example, when the cognitive meeting program receives raw data from software applications (e.g., email, social media, web conference or chat applications) and filters the data into meaningful data that is analyzed.

Sentiment analysis (i.e., emotive analysis) may be used to understand how communication may be expressed by the user (e.g., a speaker or the meeting host) and how the communication may be perceived by the meeting participants. Sentiment analysis may be processed through, for example, voice identifier software received by a microphone on a computing device, facial expression identifier software received by a camera on a computing device or by biometric identifier software received by a computing device (e.g., a smart watch that measures heart rate or a smart phone camera that measures pupil dilation). Sentiment may also be measured by the tone of voice of the individuals communicating and the syntactic tone in written messages, such as emails and social media posts. Sentiment data may be received by the cognitive meeting program as data that may show the user's emotional responses. Sentiment data may also be a user's facial expressions, vocal inflections and written expressions posted to the user's social media accounts, emails or text messages.

Biometric analysis may analyze biometric patterns and provide data regarding the user's heart rate, body temperature, blood flow, pupil dilation and other physical characteristics of the user. For example, a laser on a smart watch or a smart phone may measure a user's or a participant's heightened responses during a meeting, such as changes in blood pressure, heart rate, breathing, pupil dilation or body temperature. The responses acquired may be analyzed, for example, if a participant was attentive or was uninterested during a meeting based on the breathing and heart rate.

A cognitive meeting program may use one type of analytic or may use a combination of multiple types of analyses to provide an optimal meeting recommendation format and time. For example, Watson Analytics™ (Watson Analytics and all Watson Analytics-based trademarks and logos are trademarks or registered trademarks of International Business Machines Corporation and/or its affiliates) may be used for various analytics.

The cognitive meeting program may determine what type of communication is most effective for a user and then recommend that type of communication for a meeting. Categorizing user preferences may include analyzing various meeting formats and which meeting format produces optimal outcomes, such as online meetings with audio and video, face-to-face meetings or telephone meetings. The duration and effectiveness of meetings are also analyzed. Additionally, a user's preferences are considered, for example, if a user is shy, outgoing or if a user typically requires more or less time to give an effective meeting. After analysis, the cognitive meeting program may examine what technical equipment is available at the meeting facility or home and may provide a recommendation to the user and the participants for the format type of the meeting, time of meeting and length of meeting.

In addition to meeting formats, the cognitive meeting program may also recommend which channel of communication is optimal or most effective for the user and participants, for example, email versus phone calls.

Analysis of follow-up content may be used to detect user preferences. For example, a user may say "thank you for the productive conversation over the phone," or "I will write an email to summarize," or "I prefer to discuss that over the phone." These utterances or statements by a user or a participant may be considered in the context of the communication and may be used to offer a recommendation to a user or may also be used to adjust the recommendation model for machine learning.

One example where a cognitive meeting program may be used is when a user typically feels pressured when the user goes to a doctor's appointment at the hospital since the user dislikes the hospital environment. The user may conduct an initial phone call with a doctor to explain the medical situation and if applicable, the doctor may prescribe necessary lab work if additional data is needed to determine a diagnosis. The cognitive meeting program may suggest that the initial phone call could be 30 minutes instead of a typical 15 minute conversation to give the user (i.e., the patient in this example) additional time to explain the details of the symptoms.

Alternatively, the doctor may be the user and if the doctor's patient is uncomfortable in a hospital environment, the doctor may receive a recommendation to discuss medical treatment options with the patient via a web-based meeting format using video conferencing software. The doctor may then be providing optimal care for patients using the recommended feedback.

One other example may include a user who may be under time constraints and is typically rushing back to work. The recommendation may provide a time better suited for the user when the user may be more focused and less rushed or may recommend a quick telephone conference instead of an hour long face-to-face meeting.

Figure 1:
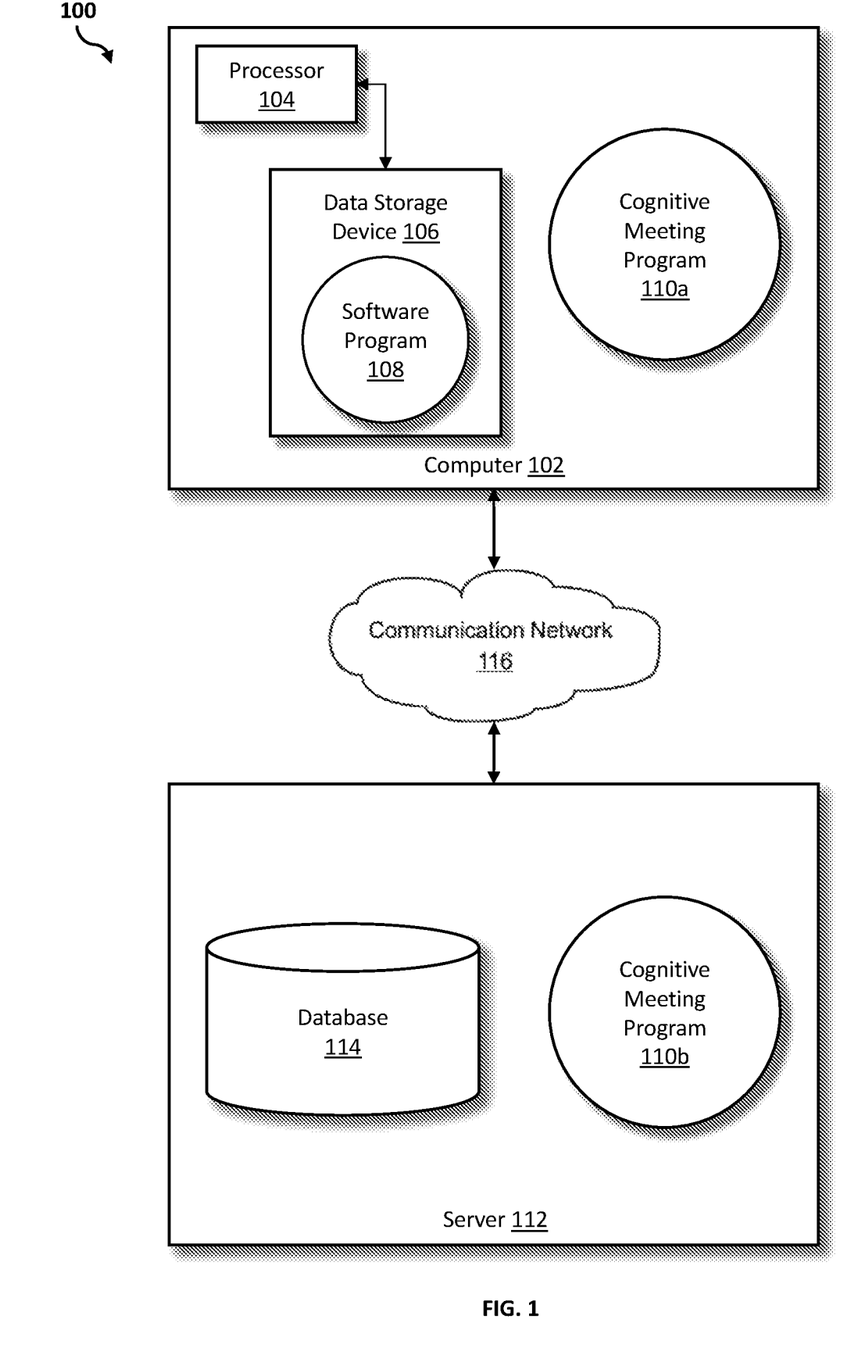
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive meeting program 110a. The networked computer environment 100 may also include a server 112 that is enabled to run a cognitive meeting program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive meeting program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the cognitive meeting program 110a, 110b (respectively) to recommend optimal and effective meeting formats and times for a user and participants. The cognitive meeting method is explained in more detail below with respect to FIG. 2.

Figure 2:
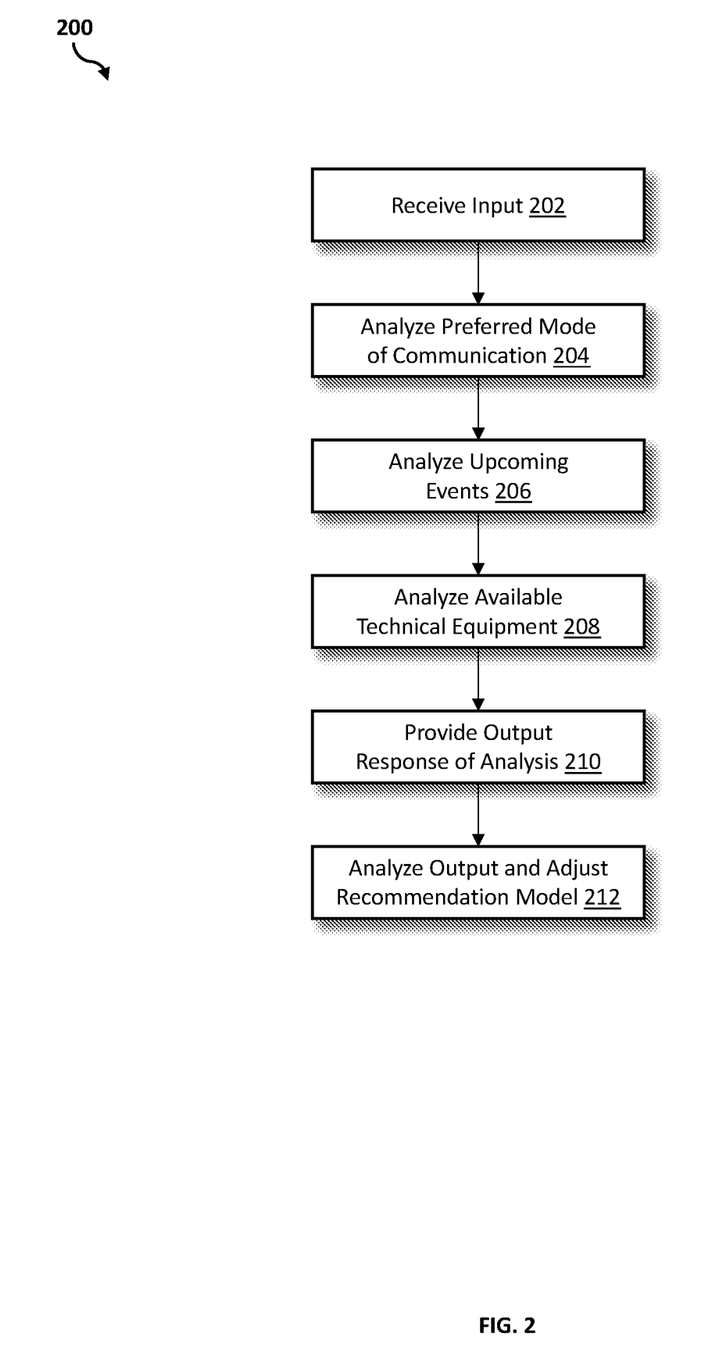
FIG. 2 is an operational flowchart illustrating a cognitive-based enhanced meeting recommendation process according to at least one embodiment.

Referring now to FIG. 2, an operational flowchart illustrating the exemplary cognitive-based enhanced meeting recommendation process 200 used by the cognitive meeting program 110a, 110b according to at least one embodiment is depicted.

At 202, an input is received. Input data may be received by various sources. Some sources may include historical data and other sources may include recommendations made by the cognitive meeting program 110a, 110b in real-time as part of the machine learning. Historical sources may be retrieved from a data repository (e.g., database 114 over a communication network 116) and real-time data may be saved to a data repository once received. Received data may originate from applications, such as a calendar or schedule application, social media, emails, text messages, chat sessions or previously provided recommendations to the user. An input may be manually entered, for example, by a user inputting via a keyboard on a computer 102 or on a smart phone a meeting event, participants invited, subject discussed, location and time into a calendar application or a task application. A verbal input may also be entered using software applications through a device microphone.

A biometric data input may also be entered using, for example, sensors, lasers or cameras on computing devices (e.g., smart watch, computer 102 or a tablet). Another input may be created and entered by the cognitive meeting program 110a, 110b which may alter a meeting recommendation based on feedback from users and participants regarding a particular meeting event that may increase the user's effectiveness and participation. Both user input and participant input may be captured for analysis by the cognitive meeting program 110a, 110b. An example of input from another individual may include data the individual posted or responded to on social media, an email, text message or chat session.

Then, at 204, a preferred mode of communication is analyzed. The preferred mode of communication is determined and analyzed using inputs received, such as verbal inputs, type written inputs or biometric inputs. Some preferred modes of communication may include, for example, a face-to-face meeting, a telephone conference or a web-based conference using a video component. The preferred mode of communication may be determined by user preference or user effectiveness. User preference may include, for example, a mode that is effective and comfortable for a user based on user anxiety levels, cognitive disability or learning disability. Alternatively, user preference or user effectiveness may be tailored towards a user's strengths and abilities. For example, a user who may be confident in a particular subject matter (i.e., science, finance or technology) may prefer a face-to-face meeting and a user who is confident in technical ability with presentations may prefer a web-based meeting if the available conference room does not have the equipment to perform the computing functions for the presentation.

A user may be categorized into different types. For example, one type may include a user (i.e., host, meeting host) who is able to use an online meeting and a face-to-face meeting and have a reasonable outcome. One other type may include a user who provides a reasonable outcome when hosting a face-to-face meeting only. One other type may include a user who prefers online meetings over face-to-face meetings, such as a shy person or user who may be uncomfortable with a face-to-face meeting but can produce an effective meeting online for participants whom the user has not met before.

The preferred mode of communication may be based on a user's past experiences and may include an analysis of the one or more users and one or more participants. User and participant analysis of a preferred mode of communication may include meeting accuracy, completeness, effectiveness and outcomes. NLP, semantic analysis, sentiment (i.e., emotive) analysis and biometric analysis may be used.

The cognitive meeting program 110a, 110b may check for meeting accuracy (i.e., accuracy of the content provided in the meeting) of a user conducting a meeting in multiple different formats (i.e., face-to-face, web based or telephone) by cross checking the content presented in real-time at the meeting with one or more historical and credible database, knowledgebase or corpus. For example, a microphone captures the content of a meeting host presenting information in a web-based video meeting. NLP and semantic analysis may be used to parse the verbal communication about a historical reference and a PDF document being shared with the participants on a computer screen. Once the unstructured data is parsed, the cognitive meeting program 110a, 110b may cross-reference the data with, for example, the Library of Congress existing knowledge base by communicating with a local server over a communication network 116, therefore providing an accuracy analysis for the content of the meeting.

The cognitive meeting program 110a, 110b may also evaluate the completeness of the content provided during the meeting when the meeting may be presented in multiple different formats. The completeness of the content may be evaluated by, for example, monitoring a group chat discussion during or after the meeting where the participants keep asking for more content due to confusion during the presentation. NLP, semantic analysis, sentiment analysis and biometric analysis may be used. NLP and semantic analysis may analyze the data from, for example, the chat discussions and the presentation documents to analyze the interaction between the user and participants and to extract meaningful data from the discussion, the chat and the presentation documents. Sentiment analysis and biometric analysis may, for example, measure syntactic tone in written messages and voice analysis while measuring biometric pattern reactions to the presentation.

The cognitive meeting program 110a, 110b may also evaluate the outcome of the meeting when the meeting may be presented in multiple different formats. The outcome of a meeting may be analyzed using the previously stated analyses (e.g., NLP, semantic analysis, sentiment analysis and biometric analysis) and evaluated by identifying, for example, positive, negative, indifferent or engaged user and participant communications or biometric pattern reactions during and after a meeting or event. Biometric results (i.e., blood pressure, heart rate, breathing, pupil dilation or body temperature) may be analyzed and the results of the analysis may differ from, for example, a chat message sent from a participant about a meeting.

For example, a participant may respect the host of the meeting and may explicitly express excitement during and after a meeting, however, the biometric measured level of excitement may be different than what was communicated to the user and fellow participants. Alternatively, a user or a host of a meeting may explicitly express that the user prefers a face-to-face meeting but the biometric data may show that the user has anxiety and heightened biometric functions during the meeting. The cognitive meeting program 110a, 110b may run a biometric data analysis and may produce results that align with the explicit communication about a particular meeting or may differ from the explicit communication of a particular meeting.

Next, at 206, upcoming events are analyzed. Upcoming events may be, for example, analyzed from software applications (e.g., email, text message, calendar, social media or notes application) running on a user's computer 102, smart phone or tablet. Meetings and events may be stored on various software application platform databases that store the event title, date, time, subject, location and invited participants. Preferred modes of communication, from step 204, may provide data used in analyzing if the upcoming event should be held in a particular format.

For example, an executive has multiple meetings scheduled on a calendar application and each meeting has varying subject matters and different participant groups. The data on the executive's calendar application may provide the cognitive meeting program 110a, 110b with information to analyze, such as, for the executive's sales meetings, the executive is effective during face-to-face meetings, however, for the executive's team meeting for a new product rollout, a telephone conference saves commuting time and is the same level of effectiveness as a face-to-face meeting.

Then, at 208, available technical equipment is analyzed. The cognitive meeting program 110a, 110b may search for available technical equipment (i.e., from an office database equipment list) for a particular meeting format at the determined location for the meeting. For example, if a user's preference is to meet with a particular group of participants face-to-face, the cognitive meeting program 110a, 110b may search for and identify equipment available (i.e., conference room with a projector for a presentation) to hold a face-toface meeting at the location of the user or the participants. Alternatively, for example, if a user's preference is to meet with a particular group of participants via telephone conference, the cognitive meeting program 110a, 110b may search for and identify equipment available (i.e., conference room or an office with a speaker telephone) to hold the telephone conference from.

Next, at 210, an output response of the analysis is provided. The output may be presented in real-time to the user via a text or type written message or via verbal communication using speakers or headphones. The output may be sent over a communication network 116. The response or recommendation may, for example, send an email or a text message to a user, providing the details (i.e., date, time, location, duration and participants) of the meeting. The recommendation may also be provided, for example, as a voice memo, stored voice message or real-time voice message on a smart phone or a computing device using the device speakers or headphones. The recommendation and provided feedback may also populate a calendar software application with the user's effective preferences and availability directly to, for example, the user's smart phone or computer 102 and send the calendar event to the participants.

At 212, the output is analyzed, and the recommendation model is adjusted. The output may be analyzed and stored in, for example, a cloud database, a knowledge base or a corpus for future recommendations. The cognitive meeting program 110a, 110b may continuously update the user preferences as the preferences may change over time. For example, a user is a new employee at a financial firm and in the beginning of the employment period, the user is less confident in presenting data to co-workers. The cognitive meeting program 110a, 110b may provide an output at step 210 to recommend a web-based meeting. As the user becomes more confident and experienced in the financial sector subject matter, the user preferences may be adjusted to incorporate the change and recommend face-to-face meetings, which may influence subsequent meeting recommendations. Machine learning may provide new rules or adjusted rules based on previous and current feedback. The current feedback may become a previously provided recommendation to the user in future inputs and analyses.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
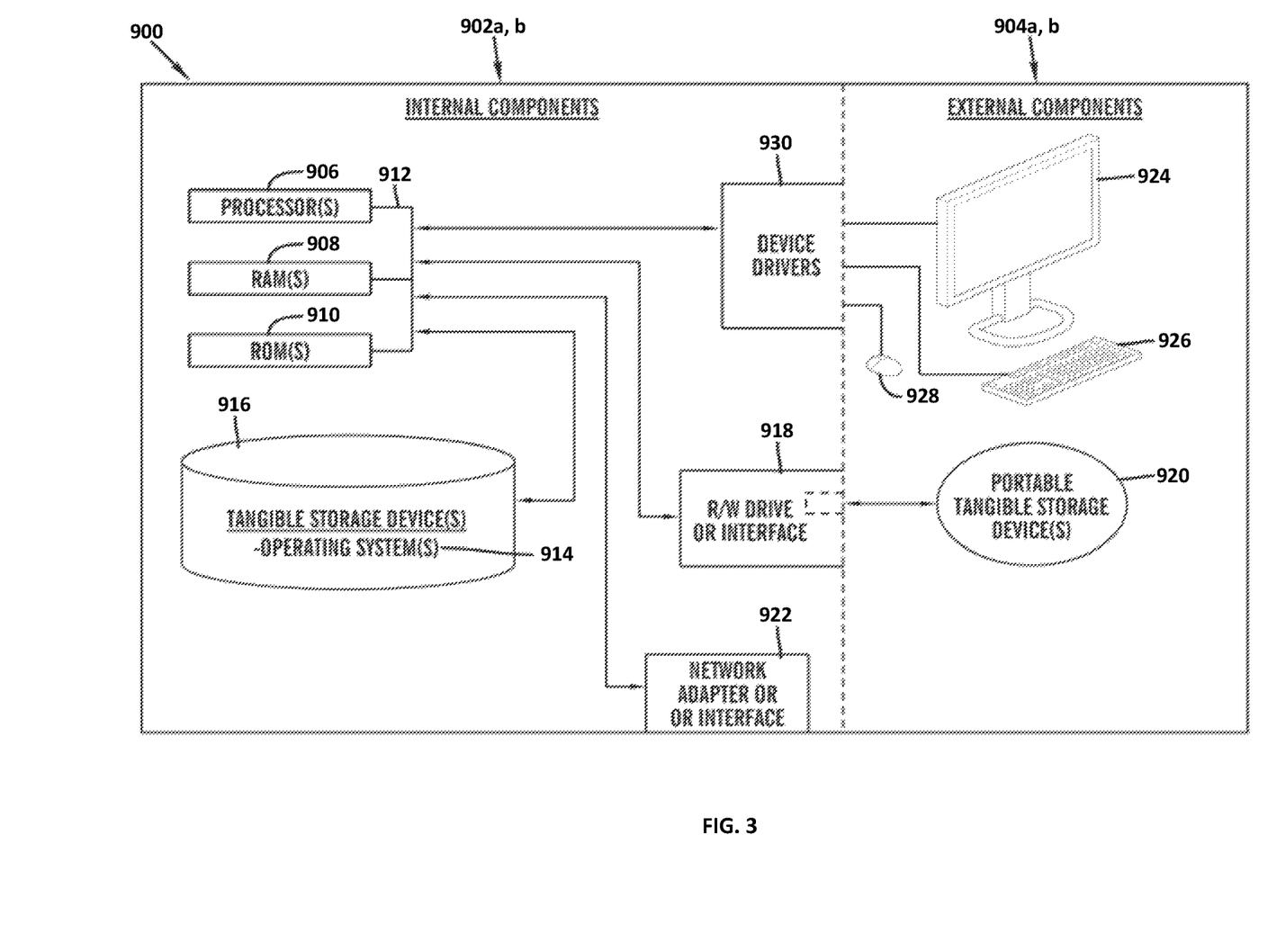
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the cognitive meeting program 110a in client computer 102, and the cognitive meeting program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive meeting program 110a, 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3 G or 4 G wireless interface cards or other wired or wireless communication links. The software program 108 and the cognitive meeting program 110a in client computer 102 and the cognitive meeting program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive meeting program 110a in client computer 102 and the cognitive meeting program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
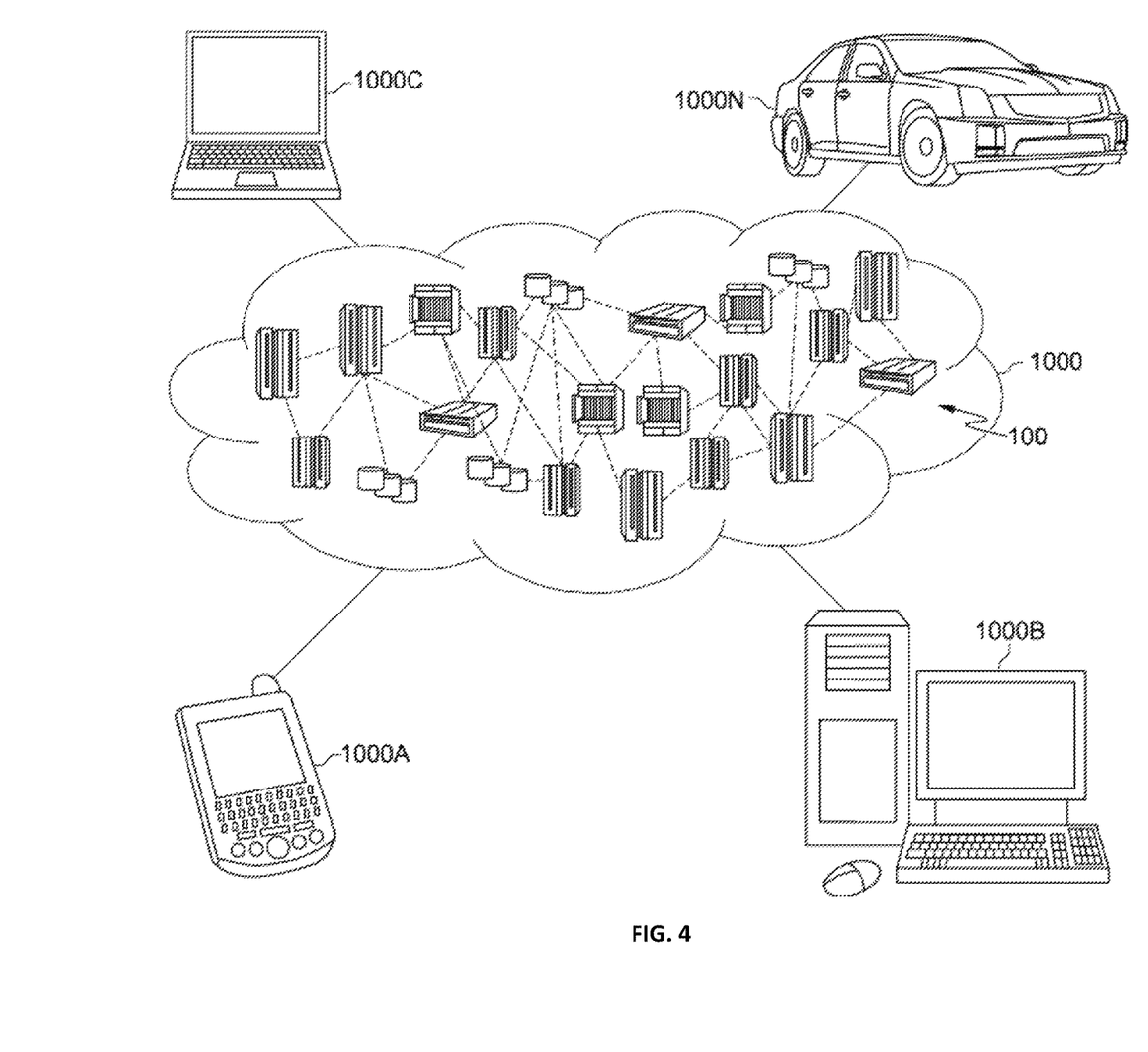
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
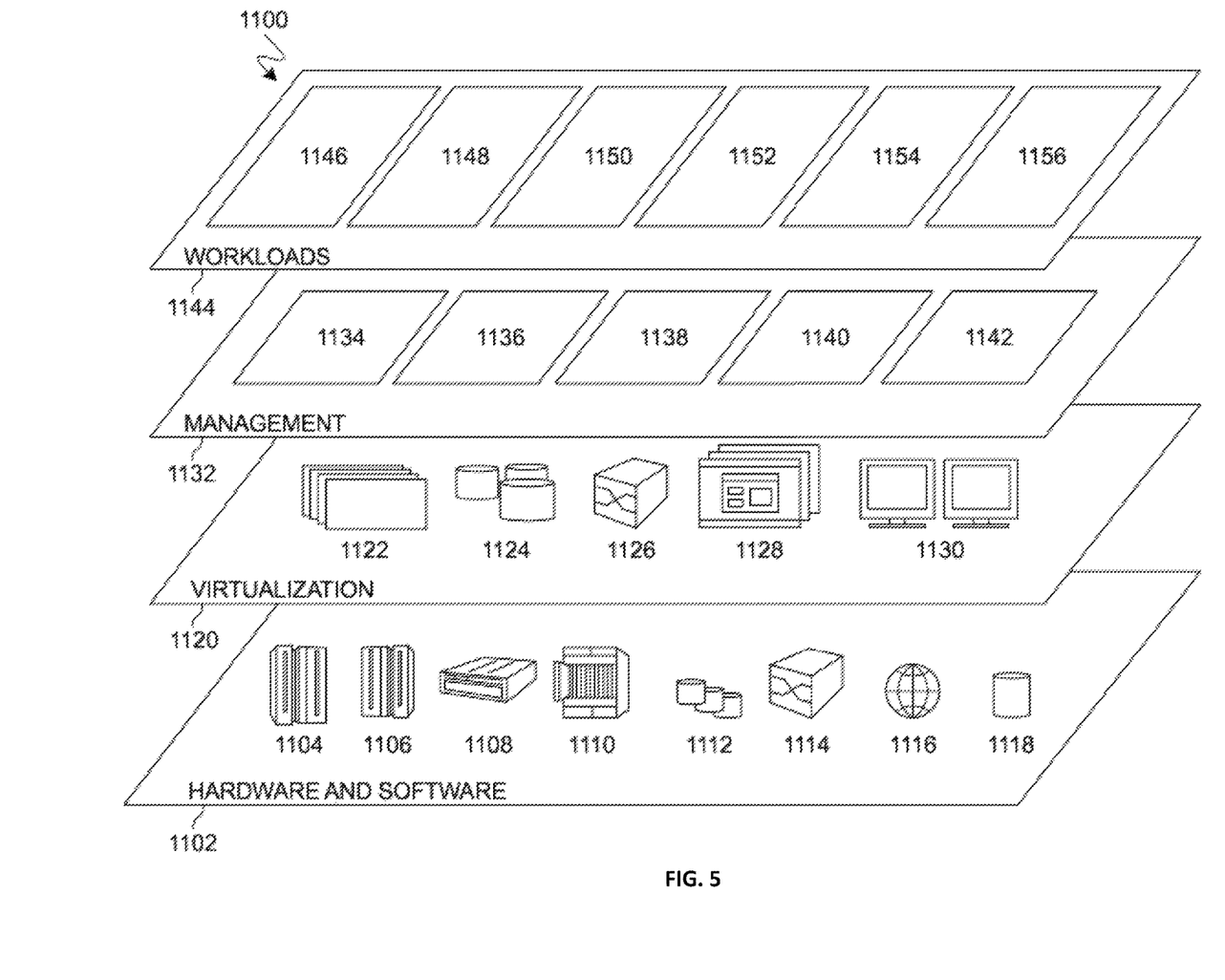
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive meeting enhancement 1156. A cognitive meeting program 110a, 110b provides a way to recommend effective meeting formats to a user based on a user's historical and current record of effectiveness.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a cognitive-based meeting format recommendation, the method comprising:
   receiving an input from various sources that include computer applications or programs and databases to determine preferred modes of communication for meetings, wherein the input includes historical data, real-time data, biometric data, feedback data and previous machine learning recommendation data;
   analyzing the user's and participants preferred mode of communication by analyzing the received input for an accuracy of content in meetings, a completeness of content provided during meetings and outcomes of meetings based on the user's and the participants past experiences,
   wherein the accuracy of content in meetings is measured by
      comparing content presented by the user during a meeting with one or more credible historical databases,
      analyzing participant feedback during the meeting by detecting the participant opinions relating to the content provided by the user during the meeting using a sentiment analysis of the feedback that identifies a syntactic tone in written messages, wherein the content provided by the user includes presentation documents,
   wherein the completeness of the content provided during meetings is measured by monitoring and evaluating a group chat discussion of the participants based on the content presented by the user during and after the meeting,
   wherein the outcomes of meetings are evaluated by analyzing the user's and the participants communications and biometric patterns during and after multiple different meeting formats;
   determining a preferred mode of communication for an upcoming meeting, wherein the preferred mode of communication includes an upcoming meeting format, length and time for the user;
   analyzing an upcoming meeting based on the preferred mode of communication;
   analyzing a plurality of technical equipment available based on the upcoming meeting;
   providing a recommendation to the user based on the preferred mode of communication, the upcoming meeting and the plurality of technical equipment available;
   analyzing the recommendation;
   adjusting a recommendation model for machine learning based on the analyzed recommendation, wherein adjusting the recommendation model for machine learning includes adjusted rules based on previous and current feedback and statements made by the user or the participant; and
   storing the recommendation model on a database for future meeting recommendations.

2. The method of claim 1, wherein the input includes content presented in real-time, wherein an accuracy of the content presented in real-time is measured by comparing the content presented in real-time with existing credible data stored in a central repository.

3. The method of claim 1, wherein the preferred mode of communication is selected from a group consisting of a face-to-face meeting format, a web-based meeting format, and a telephone conference format.

4. The method of claim 1, wherein analyzing the user's and the participants preferred mode of communication includes a natural language processing (NLP) analysis, the semantic analysis, a sentiment analysis and a biometric analysis, wherein the biometric analysis is used to measure a focus level of the user.

5. The method of claim 1, wherein the plurality of technical equipment is determined by identifying the plurality of technical equipment available at a face-to-face meeting location, a web-based meeting location or a telephone conference meeting location.

6. The method of claim 2, wherein a user input is a voice input using a computing device or a type written input using a computing device.

7. A computer system for a cognitive-based meeting format recommendation, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving an input;
   receiving an input from various sources that include computer applications or programs and databases to determine preferred modes of communication for meetings, wherein the input includes historical data, real-time data, biometric data, feedback data and previous machine learning recommendation data;
   analyzing the user's and participants preferred mode of communication by analyzing the input for an accuracy of content in meetings, a completeness of meetings and outcomes of meetings based on the user's and the participants past experiences,
   wherein the accuracy of content in meetings is measured by
      comparing content presented by the user during a meeting with one or more credible historical databases,
      analyzing participant feedback during the meeting by detecting the participant opinions relating to the content provided by the user during the meeting using a sentiment analysis of the feedback that identifies a syntactic tone in written messages, wherein the content provided by the user includes presentation documents,
   wherein the completeness of the content provided during meetings is measured by monitoring and evaluating a group chat discussion of the participants based on the content presented by the user during and after the meeting,
   wherein the outcomes of meetings are evaluated by analyzing the user's and the participants communications and biometric patterns during and after multiple different meeting formats;
   determining a preferred mode of communication for an upcoming meeting, wherein the preferred mode of communication includes an upcoming meeting format, length and time for the user;
   analyzing an upcoming meeting based on the preferred mode of communication;
   analyzing a plurality of technical equipment available based on the upcoming meeting;
   providing a recommendation to the user based on the preferred mode of communication, the upcoming meeting and the plurality of technical equipment available;
   analyzing the recommendation;
   adjusting a recommendation model for machine learning based on the analyzed recommendation, wherein adjusting the recommendation model for machine learning includes adjusted rules based on previous and current feedback and statements made by the user or the participant; and
   storing the recommendation model on a database for future meeting recommendations.

8. The computer system of claim 7, wherein the input includes content presented in real-time, wherein an accuracy of the content presented in real-time is measured by comparing the content presented in real-time with existing credible data stored in a central repository.

9. The computer system of claim 7, wherein the preferred mode of communication is selected from a group consisting of a face-to-face meeting format, a web-based meeting format, and a telephone conference format.

10. The computer system of claim 7, wherein analyzing the user's and the participants preferred mode of communication includes a natural language processing (NLP) analysis, the semantic analysis, a sentiment analysis and a biometric analysis, wherein the biometric analysis is used to measure a focus level of the user.

11. The computer system of claim 7, wherein the plurality of technical equipment is determined by identifying the plurality of technical equipment available at a face-to-face meeting location, a web-based meeting location or a telephone conference meeting location.

12. The computer system of claim 8, wherein a user input is a voice input using a computing device or a type written input using a computing device.

13. A computer program product for a cognitive-based meeting format recommendation, comprising:
   one or more computer-readable tangible storage media and program instructions stored on at least one of the one or more computer-readable tangible storage media, the program instructions executable by a processor to cause the processor to perform a method comprising:
receiving an input;
   receiving an input from various sources that include computer applications or programs and databases to determine preferred modes of communication for meetings, wherein the input includes historical data, real-time data, biometric data, feedback data and previous machine learning recommendation data;
   analyzing the user's and participants preferred mode of communication by analyzing the input for an accuracy of content in meetings, a completeness of meetings and outcomes of meetings based on the user's and the participants past experiences,
   wherein the accuracy of content in meetings is measured by
      comparing content presented by the user during a meeting with one or more credible historical databases,
      analyzing participant feedback during the meeting by detecting the participant opinions relating to the content provided by the user during the meeting using a sentiment analysis of the feedback that identifies a syntactic tone in written messages, wherein the content provided by the user includes presentation documents,
   wherein the completeness of the content provided during meetings is measured by monitoring and evaluating a group chat discussion of the participants based on the content presented by the user during and after the meeting, wherein the outcomes of meetings are evaluated by analyzing the user's and the participants communications and biometric patterns during and after multiple different meeting formats;

determining a preferred mode of communication for an upcoming meeting, wherein the preferred mode of communication includes an upcoming meeting format, length and time for the user;

analyzing an upcoming meeting based on the preferred mode of communication;

analyzing a plurality of technical equipment available based on the upcoming meeting;

providing a recommendation to the user based on the preferred mode of communication, the upcoming meeting and the plurality of technical equipment available;

analyzing the recommendation;

adjusting a recommendation model for machine learning based on the analyzed recommendation, wherein adjusting the recommendation model for machine learning includes adjusted rules based on previous and current feedback and statements made by the user or the participant; and storing the recommendation model on a database for future meeting recommendations.

14. The computer program product of claim 13, wherein the input includes content presented in real-time, wherein an accuracy of the content presented in real-time is measured by comparing the content presented in real-time with existing credible data stored in a central repository.

15. The computer program product of claim 13, wherein the preferred mode of communication is selected from a group consisting of a face-to-face meeting format, a web-based meeting format, and a telephone conference format.

16. The computer program product of claim 13, wherein analyzing the user's and the participants preferred mode of communication includes a natural language processing (NLP) analysis, the semantic analysis, a sentiment analysis and a biometric analysis, wherein the biometric analysis is used to measure a focus level of the user.

17. The computer program product of claim 13, wherein the plurality of technical equipment is determined by identifying the plurality of technical equipment available at a face-to-face meeting location, a web-based meeting location or a telephone conference meeting location.

18. The computer program product of claim 14, wherein a user input is a voice input using a computing device or a type written input using a computing device.

* * * * *